(12) United States Patent
Okuda (10) Patent No.: US 8,842,337 B2
(45) Date of Patent: Sep. 23, 2014

(54) PRINTING APPARATUS AND METHOD FOR PRINTING USING TWO KINDS OF BLACK INKS

(75) Inventor: Kohei Okuda, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 132 days.

(21) Appl. No.: 13/415,072

(22) Filed: Mar. 8, 2012

(65) Prior Publication Data

US 2012/0229861 A1 Sep. 13, 2012

(30) Foreign Application Priority Data

Mar. 8, 2011 (JP) ................. 2011-049930

(51) Int. Cl.
H04N 1/60 (2006.01)
B41J 2/21 (2006.01)
H04N 1/58 (2006.01)
H04N 1/54 (2006.01)
G06K 15/10 (2006.01)

(52) U.S. Cl.
CPC ................. *B41J 2/2107* (2013.01); *H04N 1/58* (2013.01); *H04N 1/54* (2013.01); *G06K 15/102* (2013.01)
USPC ............ 358/1.9; 358/2.1; 358/3.06; 358/518; 347/37; 347/41; 347/43

(58) Field of Classification Search
None
See application file for complete search history.

(56) References Cited

U.S. PATENT DOCUMENTS

| | | | |
|---|---|---|---|
| 6,231,149 B1 * | 5/2001 | Matsumoto ........................ 347/5 |
| 6,342,095 B1 * | 1/2002 | Takizawa et al. .......... 106/31.27 |
| 6,846,353 B2 * | 1/2005 | Sano et al. .................... 106/31.6 |
| 7,564,604 B2 * | 7/2009 | Shirasawa ...................... 358/529 |
| 7,621,621 B2 * | 11/2009 | Iwasaki et al. .................. 347/43 |
| 7,901,500 B2 * | 3/2011 | Ichinose et al. .............. 106/31.6 |
| 8,449,053 B2 * | 5/2013 | Ito et al. ............................ 347/6 |
| 8,474,952 B2 * | 7/2013 | Yoshida et al. ................. 347/41 |
| 2002/0030717 A1 * | 3/2002 | Ishikura ......................... 347/43 |
| 2006/0114481 A1 * | 6/2006 | Moore ........................... 358/1.9 |
| 2008/0145068 A1 * | 6/2008 | Mizutani ......................... 399/12 |
| 2010/0033533 A1 * | 2/2010 | Iwasaki et al. .................. 347/37 |
| 2010/0149258 A1 * | 6/2010 | Mizutani ......................... 347/43 |
| 2010/0156979 A1 * | 6/2010 | Takahashi et al. .............. 347/14 |
| 2012/0086753 A1 * | 4/2012 | Sakurada ........................ 347/43 |

FOREIGN PATENT DOCUMENTS

| | | | |
|---|---|---|---|
| JP | 2002-113850 A | 4/2002 |
| JP | 2006-168370 A | 6/2006 |
| JP | 2010-036479 A | 2/2010 |

* cited by examiner

*Primary Examiner* — Dung Tran
(74) *Attorney, Agent, or Firm* — Nutter McClennen & Fish LLP (57) ABSTRACT

A printing apparatus, which performs printing using a cyan ink, a magenta ink, a yellow ink, and two kinds of black inks, includes an image data acquisition section configured to acquire image data representing an image targeted for printing; a black line specification section configured to specify a black line included in the image on the basis of the image data; a printing control section configured to perform control so as to, along with performing printing of the black line by using the two kinds of black inks, perform printing with respect to pixels forming at least one portion of the black line so as to overlap the two kinds of black colors, and perform printing of a portion other than the black line by using at least one of the cyan ink, the magenta ink, the yellow ink, and the two kinds of black inks.

10 Claims, 6 Drawing Sheets

FIG. 5D

PRINTING APPARATUS AND METHOD FOR PRINTING USING TWO KINDS OF BLACK INKS

BACKGROUND

1. Technical Field

The present invention relates to printing apparatuses which perform printing by ejecting inks through nozzles.

2. Related Art

Nowadays, typical printing apparatuses are capable of printing each of CMYK inks, and perform printing of any of CMYK inks with respect to each pixel. Further, particularly, printing apparatuses configured to be capable of using two kinds of K inks are well known, and as an example thereof, in JP-A-2002-113850, there has been disclosed a technology in which, with respect to an internal area enclosed by an edge area, recording is performed with combination of a first black ink and a second black ink.

In such an existing technology, however, there has been a disadvantage in that, sometimes, printed portions to be viewed as continuous lines result in being viewed as discontinuous lines. That is, nozzles included in each of printing apparatuses are, sometimes, subjected to certain manufacturing errors during a manufacturing process therefore, and as a result, because of the manufacturing errors regarding the nozzles, ink droplets are recorded on positions different from record positions on which ink droplets ejected through nozzles specific to the record positions are to be recorded. Under such a condition, the misalignments of record positions specific to nozzles bring portions, within which ink droplets are essentially to be recorded continuously so as not to allow corresponding parts of the surface of print paper to be viewed, into a condition in which the corresponding parts of the surface of print paper are likely to be viewed, so that the portions to be viewed as continuous lines are likely to be viewed as discontinuous lines. Such a condition is a disadvantage particularly in printing of drawings in which lots of fine lines are used. In addition, in JP-A-2002-113850, although the two kinds of black inks are used within the internal area enclosed by the edge area, unfortunately, there is not disclosed a configuration in which, with respect to fine lines forming the edge area, the two kinds of black inks are allowed to be used. Moreover, in JP-A-2002-113850, the number of kinds of ink droplets recorded with respect to one pixel is merely one, and thus, even though the two kinds of black inks are used, it is difficult to prevent occurrences of a phenomenon in which printed fine black lines to be viewed as continuous lines result in being viewed as discontinuous lines.

SUMMARY

An advantage of some aspects of the invention is to provide a technology which enables suppression of occurrences of a phenomenon in which printed black lines to be viewed as continuous lines result in being viewed as discontinuous lines.

The above-described printing apparatus according to a first aspect is configured to, in order to record ink droplets so as to, with respect to pixels forming at least one portion of the black line, overlap the two kinds of black inks, perform control of ejections of ink droplets through nozzles. That is, by performing recording so as to overlap two kinds of black inks, as a result, on ink droplets which have been formed on the printing medium by a firstly recorded one of the two kinds of black inks, the other one of the two kinds of black colors is further recorded. In this case, the secondly recorded black ink is added onto, not the printing medium in a dry condition, but black ink droplets in a wet condition, and thus, is likely to be spread more widely along the surface of the printing medium, as compared with a case where an aggregate of black ink droplets, which has the same amount as the total amount of two aggregates of black ink droplets, which are independently recorded, is recorded once.

Moreover, in the case where two kinds of black ink droplets can be ejected from a printing head, the two kinds of black ink droplets are ejected through corresponding different nozzles. Therefore, assuming that the two kinds of black ink droplets are ejected with respective to the same pixel through two corresponding nozzles, even though one of the two nozzles is a nozzle through which one of the two kinds of black ink droplets are ejected onto a position misaligned from a default position because of certain manufacturing errors and the like, the other one of the two nozzles is highly likely to be a nozzle through which the other one of the two kinds of black ink droplets are ejected onto a position different from the misaligned position. Therefore, even though the first recording of black ink droplets results in a condition in which black lines to be recorded as continuous line are recorded as discontinuous lines, the second recording of black ink droplets enables suppression of occurrences of such a condition, and improvement of the condition into a condition in which the discontinuous lines are likely to be viewed as continuous lines.

Here, the printing apparatus according to the first aspect is configured to be capable of performing printing by causing the printing head to eject the cyan ink, the magenta ink, the yellow ink, and the two kinds of black inks. That is, the printing apparatus is configured to have two kinds of black colors which are available when performing printing in achromatic colors. The two kinds of black colors may have the same characteristic, or may have respective characteristics different from each other. In the case where the characteristics are different from each other, applications of the respective black inks may be different from each other, or concentrations of the respective black inks may be different from each other. That is, in the configuration in which the two kinds of black colors are used, usually, either of the two kinds of black colors is selected and used in accordance with a specific application or a required concentration, but, when printing black lines, the two kinds of black inks are concurrently used.

Here, with respect to applications of the respective two kinds of the black inks, a case, in which the applications correspond to respective specific printing media to be used, can be assumed. For example, a case, in which the printing apparatus is provided with a matte-black ink for matte paper and a photo-black ink for glossy paper, can be assumed. Further, with respect to concentrations of the respective black colors, a case, in which the concentrations are made different from each other so that the concentrations can be suitable for respective specific targets for printing, can be assumed. For example, a configuration in which, when printing documents and drawings, the first black ink of high concentration is employed, and when printing photographs, the second black ink whose concentration is lower than that of the first black ink is employed, can be adopted. In addition, in the case where the first black ink is an ink whose concentration is higher than that of the second black ink, when printing the black lines, it is preferable to perform setting of a usage amount of the first black ink so as to make the usage amount of the first black ink be equal to an upper limit of a recordable amount of the first black ink per a unit of area of a printing medium. According to this configuration, it is possible to, along with maintaining a condition in which the black lines can be printed in a maximum high-density black color, suppress occurrences of discontinuity of each of the black lines due to certain manufacturing errors and the like by using the second black ink concurrently with the first black ink. In addition, the concentration of the black ink can be adjusted by handling colorants. That is, in the case where two kinds of colorants included in the respective first and second black colors are the same or similar, if an amount of the colorant per a unit amount of the first black ink is larger than an amount of the colorant per a unit amount of the second black ink, the concentration of the first black ink is higher than that of the second black ink. Further, in the case where two kinds of colorants included in the respective first and second black inks are different from each other, if a brightness of a unit amount of the first black ink having been recorded on a prescribed printing medium is lower than a brightness of a unit amount of the second black ink having been recorded on the prescribed printing medium, the concentration of the first black is higher than that of the second black ink.

Further, the black line specification section is configured to be capable of specifying black lines included in the image, and the printing control section is configured to be capable of adjusting the timings of ejecting inks by performing control of the printing head, and further, is configured to be capable of performing printing of the black lines and portions other than the black lines by performing corresponding control methods different from each other. That is, when performing printing of the black lines, the printing control section is configured not to use chromatic colors, but to be capable of performing printing using the two kinds of black colors and performing recording with respect to pixels forming at least one portion of the black lines so as to overlap the two kinds of black colors. Further, when performing printing of portions other than the black lines, the printing control section is configured to perform printing by using at least one of color inks included in the printing apparatus.

Naturally, pixels targeted for overlapping the two kinds of black inks may be all pixels forming the black lines, and can be adjusted so that each of usage amounts of the respective two kinds of black inks is within a range not exceeding a limited amount of a recordable amount of an ink per a unit of area of a printing medium. Various configurations can be adopted as a configuration in which printing of black lines is performed by using the two kinds of black colors. For example, a configuration in which the printing apparatus according to the first aspect acquires print data to which flags, each indicating whether corresponding print data represents a black line, or not, are caused to correspond, and when performing printing on the basis of the print data, with respect to pixels which can be specified as pixels forming the black line on the basis of the flags, the printing apparatus performs printing using the two kinds of black colors, can be adopted. Moreover, a configuration in which the printing apparatus according to the first aspect analyzes image data representing images targeted for printing prior to creation of print data, and with respect to pixels which have been specified as pixels forming the black line through the analysis, the printing apparatus performs color conversion processing and half tone processing so as to make it possible to use the two kinds of black colors, can be adopted.

Further, portions other than black lines may be printed in chromatic colors or achromatic colors. Naturally, when performing printing in the chromatic colors, at least one of the cyan ink, the magenta ink and the yellow ink is used. Further, applying the first aspect of the invention to a configuration in which black portions other than black lines are printed in the cyan ink, the magenta ink and the yellow ink, enables, with certainty, prevention of occurrences of a phenomenon in which each of the black lines is likely to be viewed as a chromatic-color line, and further, enables prevention of occurrences of a phenomenon in which, with respect to individual pixels included in both black lines and black portions other than the black lines, the three kinds of color inks are recorded so as to be overlapped by one another, and because of certain manufacturing errors and the like, sometimes, portions to be black colored are viewed as white portions.

In a configuration in which printing using the first and second black inks is performed, usage amounts of the respective first and second black inks can be determined by employing various methods. For example, a configuration in which, in the case where a usage amount having been determined in advance is available, the usage amount is handled as a default amount, and in the case where a usage amount having been determined in advance is unavailable, an amount selected from among amounts included within a variable range is handled as a usage amount, may be adopted. A more specific example is such that, the printing apparatus is configured to be capable of selecting a printing medium through a user interface (UI) of a printer driver and the like for performing control of the printing apparatus, and in the case where a printing medium having been selected through the UI is one of prescribed kinds of printing media having been determined in advance (for example, in the case where a printing medium having been selected through the UI is one of printing media provided by a manufacture of the printing apparatus), it is possible to determine usage amounts of the respective first and second black inks in advance, which are suitable for each of the prescribed kinds of printing media. Therefore, in the case where a certain printing medium selected from among prescribed kinds of printing media having been determined in advance is used, it is preferable to adopt a configuration in which printing of black lines is performed under a condition where usage amounts of the respective first and second black inks are handled as respective default amounts. In addition, in order to obtain the default amounts of the respective first and second black inks, it is sufficient to just specify appropriate usage amounts of the respective first and second black inks (for example, each of the appropriate usage amounts being an upper limit of a usage amount which does not cause running of the black ink, or the like) by recording the first and second black inks on each of the prescribed kinds of printing media.

In this case, and further in the case where a printing medium other than the prescribed kinds of printing media (for example, any printing medium other than the prescribed kinds of printing media) is used, since it is difficult to determine usage amounts of the respective first and second inks in advance, which are suitable for the printing medium, usage amounts of the first and second inks, which are selected from among amounts included within a variable range, are handled as usage amounts of the respective first and second black inks. In this case, a configuration, in which printing of black lines is performed under a condition where a default amount is handled as a usage amount of the first black ink, and an amount selected from among amounts included within a variable range is handled as a usage amount of the second black ink, enables reduction of an amount of information to be determined by a user, and thus, makes setting operations simple and easy. In addition, it is sufficient to just set the default amount of the first black ink to any amount in advance, and further, it is sufficient to just perform adjusting so as to cause the total amount of usage amounts of the respective two kinds of black colors, that is, the total amount of the default amount of the first black ink and a usage amount of the second black ink, which is selected from among amounts included within a variable range, to be an appropriate usage amount. With respect to selection of a usage amount of the second black ink from among amounts included within a variable range, a configuration in which a user selects a usage amount of the second black ink through the prescribed UI, can be adopted.

In this case, the usage amount of the second black ink, which is specified by the user, may be set so that the total amount of the two kinds of black color inks can be within a range not exceeding an upper limit of a recordable usage amount of an ink which corresponds to the two kinds of black color inks in this case, and an auxiliary function, which allows the user to input an optimal usage amount, may be provided. For example, a configuration, in which, under a condition where a usage amount of the first black ink is set to a default amount, and a usage amount of the second black ink is set to any of a plurality of usage amounts, printing of a plurality of patches, which correspond to the respective plurality of usage amounts regarding the second black ink, is performed, and then, a usage amount of the second black ink is specified by selecting any one of patches, which have brought appropriate usage amounts, from among the patches having been printed, can be assumed. In addition, prescribed kinds of printing media and printing media other than the prescribed kinds of printing media may be determined in advance. Further, the prescribed kinds of printing media and printing media other than the prescribed kinds of printing media may cover all printing media available for the printing apparatus, and furthermore, other kinds of printing media may be made available for the printing apparatus.

The black line may be a line which is to be viewed as a continuous line, and which is viewed as a discontinuous line because of occurrence of misalignments of respective recording positions of nozzles due to certain manufacturing errors. Such a black line may be assumed to be, for example, a line having a width whose size is smaller than or equal to a size of two dots. Naturally, a configuration, in which a line having a width whose size is equal to a size of one dot is regarded as a black line, may be also adopted.

In order to prevent occurrences of a phenomenon in which a printed black line to be viewed as a continuous line is viewed as a discontinuous line, a configuration, in which, when at least one black line is included in a drawing targeted for printing, two kinds of black inks are ejected through a plurality of nozzles so that the at least one black line can be printed in the two kinds of black inks, may be adopted. That is, in the case where an image targeted for printing is a drawing, or in the case where a user specifies that an image targeted for printing is a drawing, the above-described configuration according to the first aspect of the invention can be adopted. Under a condition where occurrences of a phenomenon in which, printed black lines to be viewed as continuous lines are viewed as discontinuous lines, are to be suppressed, the above-described configuration enables, with certainty, suppression of occurrences of discontinuity of each of the black lines.

The above-described printing method according to the second aspect of the invention, in which, printing of the black line is performed so as to overlap the two kinds of black inks can be applied to an apparatus and a program. Further, in applications of the printing method according to the second aspect, there are various configurations, such as a configuration in which each of the apparatus and the program is realized in a single apparatus, and a configuration in which, in a certain apparatus having multiple functions, each of the apparatus and the program is realized by utilizing components common to the multiple functions.

BRIEF DESCRIPTION OF THE DRAWINGS

The invention will be described with reference to the accompanying drawings, wherein like numbers reference like elements.

DESCRIPTION OF EXEMPLARY EMBODIMENTS

Here, embodiments according to the invention will be described in accordance with the following order.
(1) Configuration of Printing Apparatus
(1-1) Printing Control Processing
(2) Other Embodiments
(1) Configuration of Printing Apparatus Referring to FIG. 1 which is a block diagram illustrating a configuration of a printing apparatus 10 according to this embodiment, the printing apparatus 10 has a control unit 20 including a RAM, a CPU and the like, and a ROM 30. Further, the printing apparatus 10 is capable of causing the control unit 20 to execute a printing control program 21 recorded in the ROM 30. Moreover, the ROM 30 also includes a color conversion table 30a and a black-line color conversion table 30b recorded therein. Further, these two kinds of color conversion tables are provided therein with corresponding blocks of data which are used for, with respect to each of pixels included in image data, conversion of RGB (R: red, G: green, and B: blue) grayscale values into grayscale values corresponding to respective ink colors during the process of executing the printing control program 21.

Figure 1:
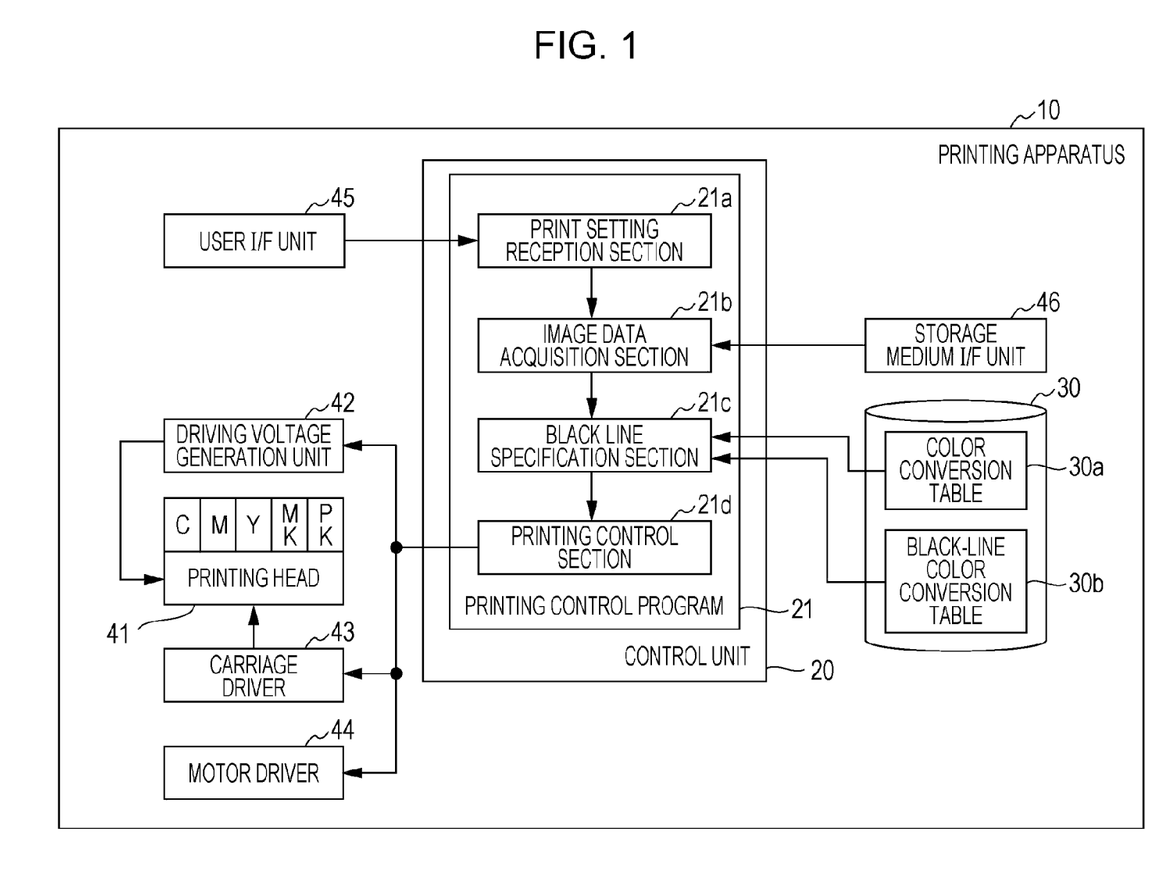
FIG. 1 is a block diagram illustrating a printing apparatus according to embodiments of the invention.

The printing apparatus 10 according to this embodiment is an ink jet printer which performs printing in four colors, i.e., CMYK (C: cyan, M: magenta, Y: yellow, K: black), and includes a printing mechanism provided therein a printing head 41, a driving voltage generation unit 42, a carriage driver 43, a motor driver 44 and the like, a user I/F unit 45 and a storage medium I/F unit 46. Further, the printing apparatus 10 includes a transportation roller (not illustrated) provided along a transportation path of a printing medium, and causes the transportation roller to rotate with a rotation driving force of a motor (not illustrated) connected to the rotation roller; thereby enabling transportation of the printing medium into a printing area between the printing head 41 and a platen (not illustrated), and further, transportation of the printing medium having been subjected to printing to eject it from the printing apparatus 10. The motor driver 44 includes a circuit configured to generate a voltage to be applied to the motor. Further, in accordance with a control signal outputted from the control unit 20, the motor driver 44 causes the circuit to generate a voltage of certain level and apply the voltage to the motor so that the voltage can drive the motor to start rotating, with a rotation driving force having strength specified by the control unit 20, at timing when instructed by the control unit 20.

The printing head 41 has a plurality of nozzles formed thereon, and is capable of ejecting ink droplets through each of the nozzles. In this embodiment, the printing head 41 has a plurality of rows, for each of which a plurality of nozzles is aligned in a direction. Each of the nozzles is an opening of an ink chamber connected to an ink tank (not illustrated), and is configured to have side walls which are movable in conjunction with expansions and contractions of a piezoelectric element. The conjunctions and expansions of the piezoelectric element cause a variation of the volume of the ink chamber in conjunction with the movements of the side walls of the ink chamber; thereby causing ink contained in the ink chamber to eject through the nozzle.

A plurality of piezoelectric elements corresponding to the respective plurality of nozzles is connected to the driving voltage generation unit 42. The driving voltage generation unit 42 has a circuit configured to generate cyclic voltage waveforms each having a prescribed waveform, and the piezoelectric element, which has been supplied with the voltage waveform, drives ink droplets to eject through the nozzle. The control unit 20 outputs a control signal, and thereby, can select a voltage waveform from among the voltage waveforms generated by the driving voltage generation unit 42, and can supply the selected voltage waveform to a piezoelectric element corresponding to any of the nozzles.

Further, in this embodiment, the printing head 41, which is carried by a carriage (not illustrated), is configured so as to be reciprocatable in a prescribed direction. That is, the carriage is capable of shifting the printing head 41 in a prescribed direction in accordance with control of the carriage driver 43. Further, when the printing head 41 reaches an edge portion of a range within which the printing head 41 can shift in a direction vertical to the prescribed direction, the control unit 20 outputs a control signal to the motor driver 44, and thereby, causes the motor driver 44 to transport the printing medium by a unit of distance in a direction vertical to the shifting direction of the printing head 41.

Moreover, every time the printing head 41 shifts by the unit of distance in the prescribed direction, the control unit outputs a control signal to the driving voltage generation unit 42, and thereby, causes the driving voltage generation unit 42 to select a prescribed voltage waveform, and eject ink through the nozzle by supplying the piezoelectric element with the selected voltage waveform. As a result, the control unit 20 can print images on the recording medium by recording ink thereon. In this specification document, an operation of shifting the printing head 41 in the prescribed direction is called a main-scanning. Further, an operation of shifting the printing head 41 in the direction vertical to the main-scanning direction is called a sub-scanning.

The printing apparatus 10 according to this embodiment performs printing using four colors CMYK, and for the black color, two kinds of inks are available. Therefore, in order that the printing apparatus 10 performs printing using the black ink, grayscale values corresponding to the respective two kinds of black colors are required to be made specific. Specifically, in the printing apparatus 10 according to this embodiment, a first black ink (hereinafter, which will be called a "matte-black" (MK) ink) is used when the printing medium is matte-paper; while a second black ink (hereinafter, which will be called a "photo-black" (PK) ink) is used when the printing medium is glossy paper. Therefore, grayscale values corresponding to respective ink colors consist of grayscale values corresponding to respective ink colors C, M, Y, MK and PK, so that the color conversion table 30a is provided in advance so as to correspond to each of the two kinds of printing media, and further, in the color conversion table 30a corresponding to each of the two kinds of printing media, correspondence relations between RGB grayscale values and CMYMKPK grayscale values are specified at a plurality of representative points.

In addition, in this embodiment, the PK ink is an ink whose concentration is lower than that of the MK ink. Further, as described above, the two kinds of black ink colors are selected and used in accordance with the respective two kinds of printing media, and usually, either an MK grayscale value or a PK grayscale value of CMYMKPK grayscale values is fixed to "0". However, in the case where a drawing is printed on the matte-paper, the MK and PK inks are concurrently used if the drawing includes black lines. Therefore, besides the color conversion table 30a, the black-line color conversion table 30b is recorded in the ROM 30. The black-line conversion table 30b is a color conversion table used for converting RGB grayscale values into MKPK grayscale values with respect to the black lines.

Figure 3A:
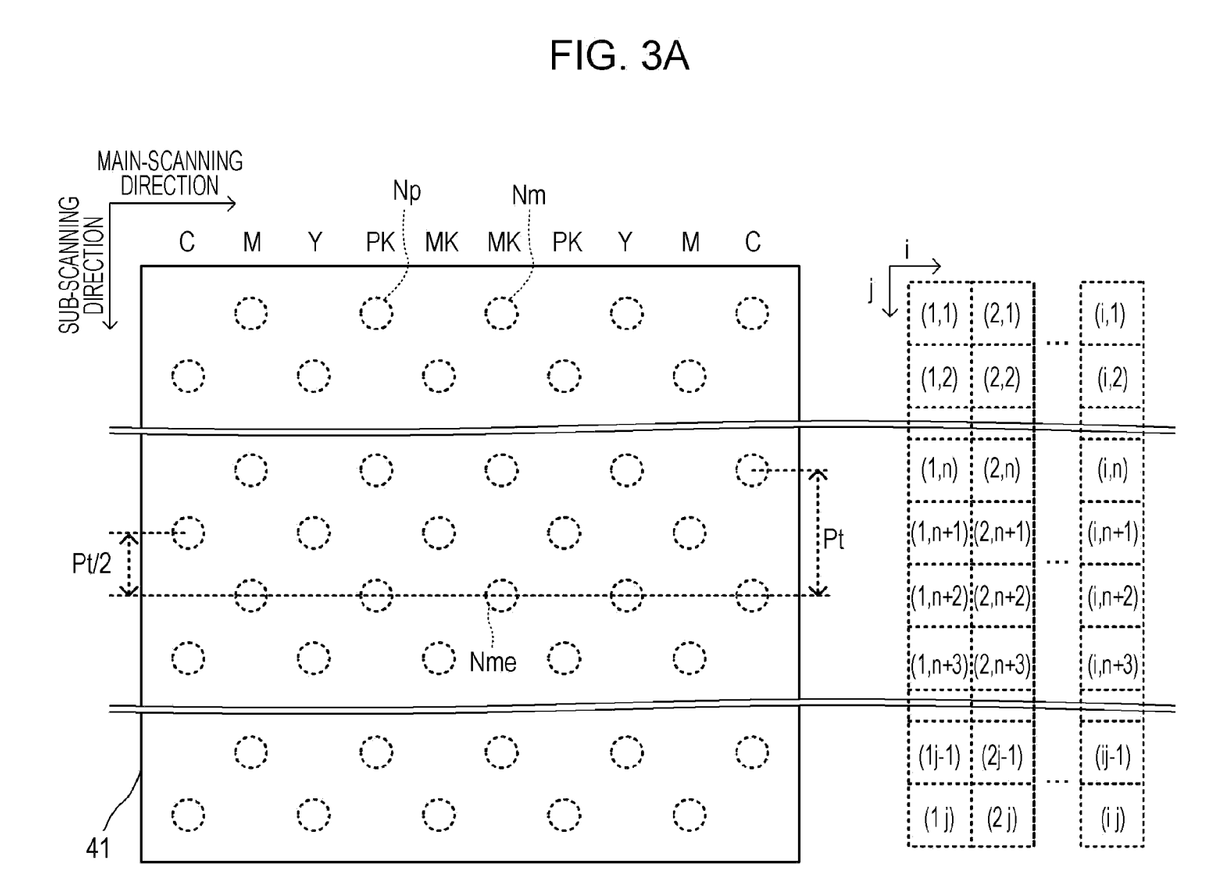
FIG. 3A is a schematic diagram illustrating a printing head according to embodiments of the invention.

FIG. 3A is a schematic diagram illustrating a surface of the printing head 41 on which nozzles are formed, and each of the nozzles is schematically represented by a circle in a dashed line. The printing head 41 is configured to include nozzles which are aligned in the main-scanning direction, and which are also aligned in the sub-scanning direction, and the same color ink is ejected through a plurality of nozzles which are aligned along each of nozzle rows extending in the sub-scanning direction. In this embodiment, color inks C, M, Y, PK, MK, PK, Y, M and C are ejected through corresponding nozzle rows which are arrayed in the main-scanning direction from the most-left side nozzle row of the schematic diagram shown in FIG. 3A. Moreover, the printing head 41 includes five pairs of nozzle rows, and the same color is ejected through each of the five pairs of nozzle rows. Moreover, any two corresponding nozzles included in the respective two nozzle rows forming any of the five pairs, are located out of alignment by half a nozzle pitch Pt in the sub-scanning direction. Therefore, it is possible to perform printing under a condition where a resolution in the sub-scanning direction per one main-scanning is half the nozzle pitch Pt.

The user I/F 45 unit includes user interfaces, such as a display and buttons (not illustrated), and the control unit 20 outputs a control signal to the user I/F 45 unit, and thereby, can provide any information to users. Further, upon reception of any operation of a button and the like, performed by a user, a signal corresponding to the operation is outputted from the user I/F unit 45, and by causing the control unit 20 to acquire the outputted signal, it is possible to receive the content of the operation having been performed by the operator. The storage medium I/F unit 46 is a portion into which a storage medium can be inserted, and the control unit 20 can retrieve information stored in the storage medium having been inserted into the storage medium I/F unit 46.

(1-1) Printing Control Processing

Next, printing control processing performed by the control unit 20 in the above-described printing apparatus 10, which is executed by the printing control program 21, will be described. The printing control processing program includes a print setting reception section 21a, an image data acquisition section 21b, a black line specification section 21c and a printing control section 21*d*, and performs printing control processing in accordance with a flowchart shown in FIG. 2. In the printing control processing, firstly, the control unit 20 executes processes of the print setting reception section 21*a*, and thereby, receives a print setting a user have directed by utilizing the user I/F unit 45 (step S100). That is, the control unit 20 outputs a control signal to the user I/F unit 45, and thereby, causes the user I/F unit 45 to display a selection screen view which allows the user to make a selection as to whether a target for printing is a drawing, or not. Furthermore, the control unit 20 receives a signal outputted from the user I/F unit 45, and thereby, receives a result of the selection the user has made on the selection screen view.

Figure 2:
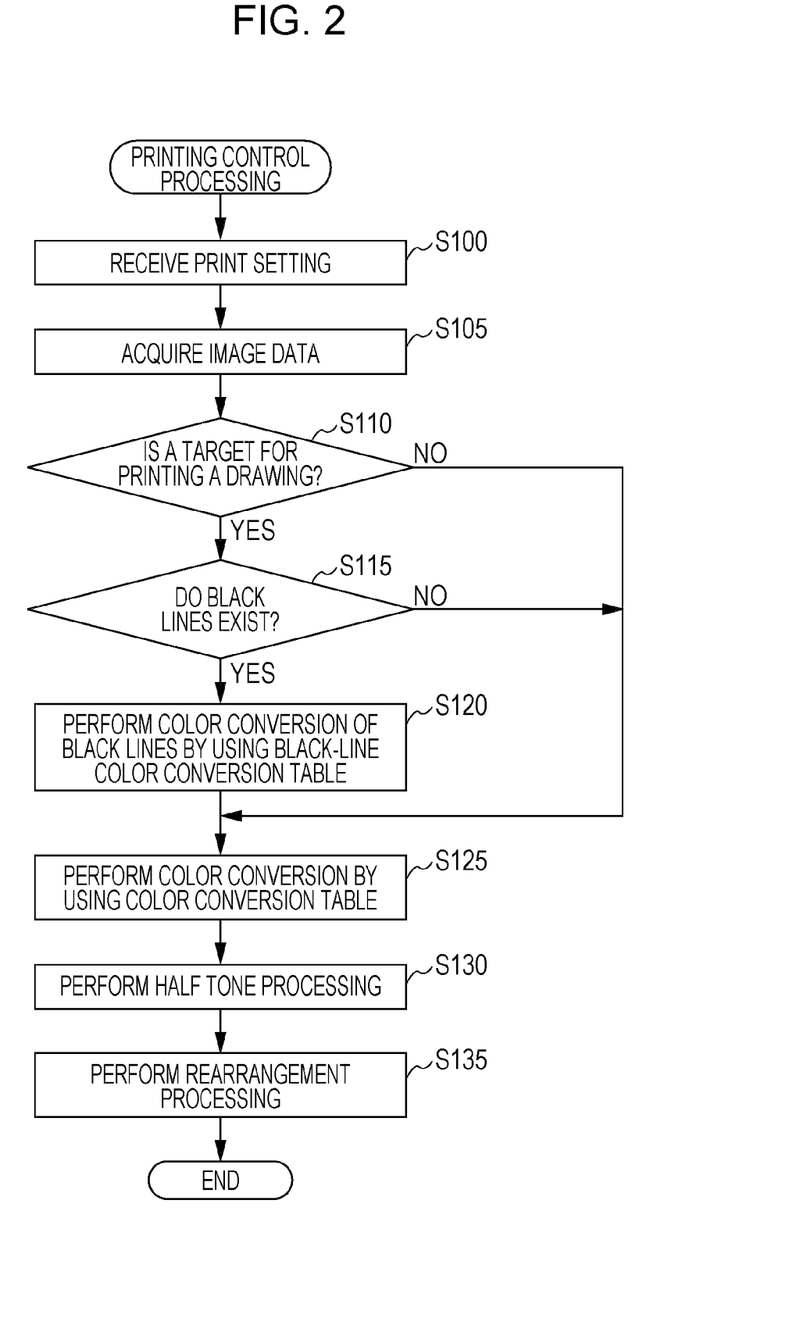
FIG. 2 is a flowchart illustrating printing control processing according to embodiments of the invention.

Next, the control unit 20 executes processes of the image data acquisition section 21*b*, and thereby, acquires a block of image data representing an image targeted for printing (step S105). That is, the control unit 20 accesses the storage medium I/F unit 46, and thereby, specifies blocks of image data, which are stored in a storage medium inserted in the storage medium I/F unit 46, as candidates of an image targeted for printing. Further, the control unit 20 outputs a control signal to the user I/F unit 45, and thereby, causes the user I/F unit 45 to display a selection screen view which allows the user to make a selection of an image targeted for printing from among the candidates thereof. Moreover, the control unit 20 receives an output signal from the user I/F unit 45, and thereby, acquires a block of image data representing an image the user has selected on the selection screen view, as a block of image data representing the image targeted for printing. In addition, here, processing for adjusting the number of pixels corresponding to the image data is performed so that printing can be performed in a default resolution.

Next, the control unit 20 executes processes of the black line specification section 21*c*, and thereby, determines whether the target for printing is a drawing, or not (step S110). That is, the control unit 20 determines whether, in step S100, the user has selected an option indicating that the target for printing is a drawing, or not. In step S110, if it is determined that the target for printing is not a drawing, the control unit 20 skips steps S115 and S120.

In contrast, if, in step S110, it is determined that the target for printing is a drawing, the control unit 20 executes processes of the black line specification section 21*c*, and thereby, determines whether any black line exists within an image targeted for printing, or not (step S115). That is, the control unit 20 accesses the image data which has been acquired in step S105, and which has pixels, the number of which has been adjusted in accordance with necessity, and thereby, extracts pixels each having RGB grayscale values each being equal to "0". Further, in the case where at least one portion, which is formed by extracted pixels, and which has a width smaller than or equal to a prescribed width size, and a length larger than or equal to a prescribed length size, exists, the control unit 20 recognizes the at least one portion as a black line, and determines that at least one black line exists within the image targeted for printing. In addition, preferably, the prescribed width size is equal to, for example, two dots or one dot, because performing printing of a continuous black line having a width equal to one dot or two dots under a condition where there exist misalignments of recording positions due to manufacturing errors with respect to nozzles is likely to cause the black line, which is to be viewed as a continuous line, to be viewed as a discontinuous line. Further, the prescribed length size may be just a length size recognizable as a line, and, for example, a configuration, in which the prescribed length size is made equal to three or more dots, can be adopted. In contrast, if, in step S115, it is determined that any black line does not exist within the image targeted for printing, the control unit 20 skips step S120.

Meanwhile, if, in step S115, it is determined that at least one black line exists within the image targeted for printing, the control unit 20 performs color conversion processing on pixels forming the at least one black line by using the black-line color conversion table 30*b* (step S120). In this embodiment, the black-line color conversion table 30*b* is a table which converts specific RGB grayscale values (i.e., R=G=B="0") into CMYMKPK grayscale values (MK="255", PK="255", and C=M=Y="0"). That is, in this embodiment, color conversion processing is performed so that, with respect to each of pixels forming the at least one black line, the two kinds of black inks can be recorded so as to be overlapped by each other.

Next, the control unit 20 performs color conversion processing on pixels, which are not yet subjected to color conversion processing, by using the color conversion table 30*a* (step S125). That is, with respect to pixels forming lines other than the at least one black line, printing is performed by using at least one of color inks consisting of C, M and Y color inks and the two kinds of black color inks. In this embodiment, pixels forming lines other than the at least one black line are subjected to color conversion processing using the color conversion table 30*a* used for execution of a usual color management. In addition, according to the color conversion table 30*a* of this embodiment, since, usually, any black portion is recorded by using one kind of black inks, black portions other than the at least one black line are recorded by using one kind of black inks, but, obviously, a configuration, in which black portions other than the at least one black line, such as a black portion which is to be colored in a single black color, and which has a width size of three or more dots, are recorded by using the two kinds of black inks, can be adopted. Further, in the case where the process flow directly proceeds to step S125 from step 110 or step S115, since any pixel is not yet subjected to color conversion processing before starting execution of processes in step S125, color conversion processing is performed on all pixels forming the image targeted for printing by using the color conversion table 30*a*.

After having completed the color conversion processing, the control unit 20 performs processes of the printing control section 21*d*, and thereby, executes halftone processing (step S130). That is, the control unit 20 creates data representing existence or nonexistence of ejection of ink droplets for each pixel on the basis of CMYMKPK grayscale values resulting from the color conversion processing. Next, the control unit 20 performs processes of the printing control section 21*d*, and thereby, executes rearrangement processing for rearranging data having been subjected to the halftone processing (step S145). That is, the control unit 20 rearranges pixels so as to allow pixels, with respect to each of which an ink droplet is to be recorded, to be located at prior positions during each main-scanning operation. Further, the control unit 20 performs control so that, in accordance with an order in which data corresponding to the rearranged pixels aligns, each nozzle of the printing head 41 can be supplied with a driving voltage in accordance with the data corresponding to each of the pixels. As a result, with respect to portions other than the at least one black line, printing is performed under a condition where a usual color management is carried out; while, with respect to the at least one black line, printing using both the two kinds of black inks is performed.

Figure 3B:
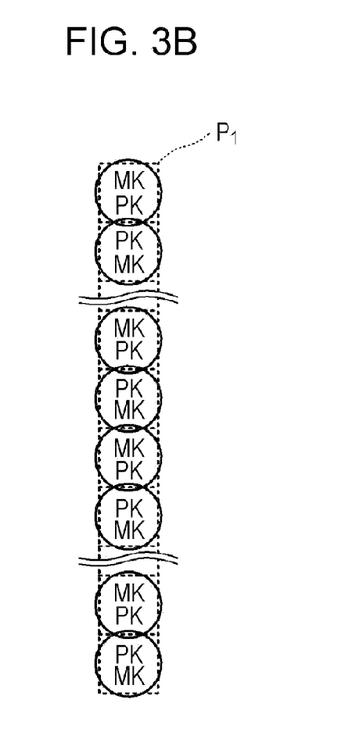
FIGS. 3B and 3C are schematic diagrams each illustrating recorded inks corresponding to individual pixels, according to embodiments of the invention.

Since a black ink to be printed at a time is either the MK ink or the PK ink, and as shown in FIG. 3A, nozzles for ejecting the respective two kinds of black inks are located at positions different from each other in the main-scanning direction, in order to form a black line, firstly, one of the two kinds of black inks, which are recorded with respect to the same pixel so as to be overlapped by each other, is printed, and secondly, the other one of the two kinds of black inks is printed. For example, regarding the printing head 41 shown in FIG. 3A, in the case where printing is performed in a condition where a resolution in the sub-scanning direction is equal to half the nozzle pitch Pt, ink droplets ejected through the respective nozzles are printed with respect to corresponding pixels each being represented by a circle in a dotted line. In addition, a coordinate representing a position of each pixel represented by a circle in a dotted line is denoted by (i, j) (wherein i, j and n shown in FIG. 3A are natural members, respectively). FIG. 3B is a schematic diagram illustrating ink droplets to be recorded with respect corresponding pixels forming a row, the corresponding pixels being each represented by a circle in a continuous line, the row being extracted from among rows shown in FIG. 3A, which includes pixels each being represented by a circle in a dotted line, and which extend in the sub-scanning direction. Further, in FIG. 3B, a black ink droplet to be firstly printed is shown at an upper portion inside each of the circles; while another black ink droplet to be secondly printed is shown at a lower portion inside each of the circles.

For example, with respect to a pixel located at the top of FIG. 3B (i.e., a pixel $P_1$ whose j-coordinate is "1"), printing is performed by using two nozzles located at the top of the printing head 41 shown in FIG. 3A, and for the nozzles aligned at the top of the printing head 41, an MK nozzle Nm is located at the right-hand side thereof, and a PK nozzle Np is located at the left-hand side thereof. Therefore, since inks droplets are ejected in accordance with a location order of corresponding nozzles, with respect to the pixel $P_1$, which is located at the top of FIG. 3B, as a result, firstly, the MK ink droplet is recorded, and secondly, the PK ink droplet is recorded. In FIG. 3B, the MK ink droplet and the PK ink droplet are represented at an upper portion and a lower portion inside the circle representing the pixel $P_1$, respectively.

Figure 3C:
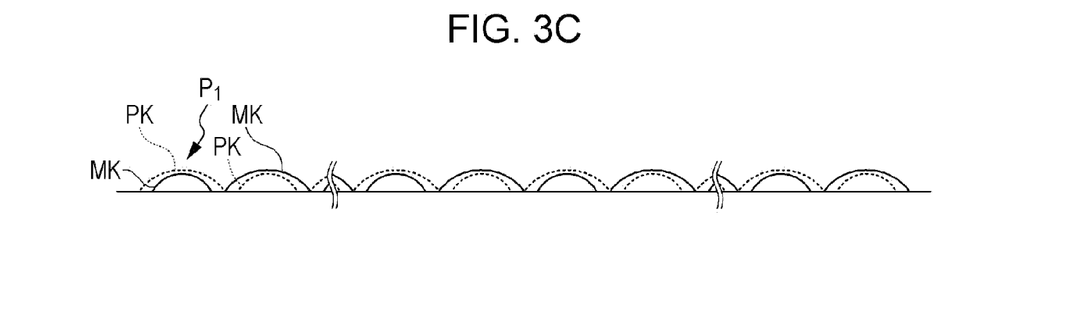

Further, FIG. 3C is a schematic diagram illustrating a condition of ink droplets printed with respect to the pixels shown in FIG. 3B, the condition of ink droplets being a condition viewed from the main-scanning direction. Moreover, in FIG. 3C, each portion in a continuous line and each portion in a dotted line denote an MK ink droplet and a PK ink droplet, respectively, and a condition resulting from recording an ink droplet on a printing medium is represented by a circular arc. Furthermore, according to this embodiment, performing printing of two black ink droplets so as to overlap the two black ink droplets, the two black ink droplets being ejected through two corresponding different nozzles, results in recording of another black ink droplet on an ink droplet formed on a printing medium by a firstly recorded black ink droplet. Therefore, in FIG. 3C, above each circular arc representing an ink droplet having been recorded firstly, a different circular arc representing another ink droplet having been recorded secondly is shown. For example, regarding the pixel $P_1$, with respect to which printing is performed by using two nozzles located at the top of the printing head 41 shown in FIG. 3A, firstly, an MK ink droplet is recorded, and secondly, a PK ink droplet is recorded, and thus, in FIG. 3C, an MK ink droplet represented by a small circular arc in a continuous line and a PK ink droplet represented by a large circular arc in a dotted line are represented as ink droplets regarding the pixel $P_1$.

Figure 4A:
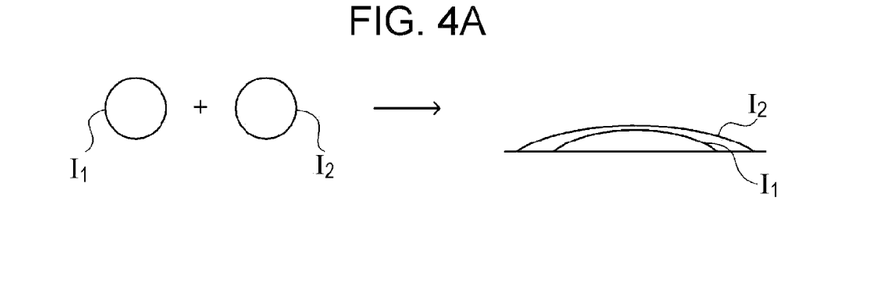
FIG. 4A is a schematic diagram illustrating recorded inks corresponding to a pixel, according to embodiments of the invention.
Figure 4B:
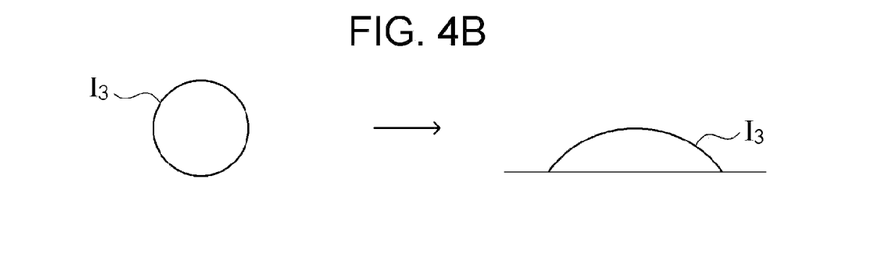
FIG. 4B is schematic diagram illustrating a recorded ink corresponding to a pixel, according to embodiments of the invention.

Such a configuration as described above, in which, an ink droplet is firstly recorded, and another ink droplet is secondly recorded, allows the second black ink droplet to be added on, not a dry printing medium, but a black ink droplet in a wet condition, and thus, the second black ink droplet is likely to be spread more widely on the printing medium, as compared with a case in which a black ink droplet having the same amount as the total amount of the first black ink droplet and the second black ink droplet is recorded once. FIG. 4A is a diagram illustrating a condition at the right-hand side thereof, in which, in the case where two black ink droplets shown at the left-hand side of FIG. 4A are serially recorded on a recording medium, the two black ink droplets are spread on the printing medium. Further, FIG. 4B is a diagram illustrating a condition at the right-hand side thereof, in which, in the case where a black ink droplet shown at the left-hand side of FIG. 4B, which has the same amount as the total amount of the two black ink droplets shown in FIG. 4A, is recorded on a printing medium, the black ink droplet is spread on the printing medium.

As shown at the right-hand side of FIG. 4A, when two kinds of black ink droplets are serially recorded so as to be overlapped by each other, since a secondly recorded black ink droplet $I_2$ is spread on and around the surface of a firstly recorded black ink droplet $I_1$, the secondly recorded black ink droplet $I_2$ is spread in a region larger than that of the firstly recorded black ink droplet I. In contrast, as shown at the left-hand side of FIG. 4B, even when a black ink droplet $I_3$ having the same amount as the total amount of the two black ink droplets is recorded once, a region on the printing medium, in which the black ink droplet $I_3$ is spread, is smaller than that in which the ink droplet $I_2$ is spread in the case where the two black ink droplets $I_1$ and $I_2$ are serially recorded. Therefore, even though the first recording of black ink droplets results in a condition in which black lines, each being to be a continuous line, are viewed as discontinuous lines, the second recording of black ink droplets enables suppression of occurrences of such a condition, and leads to an improvement in which the discontinuous lines are more likely to be viewed as continuous lines.

Figure 5A:
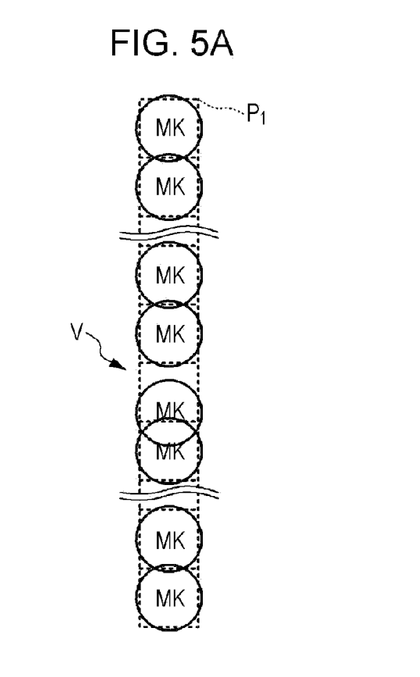
FIGS. 5A, 5B, 5C and 5D are schematic diagrams each illustrating recorded inks corresponding to individual pixels, according to embodiments of the invention.
Figure 5B:
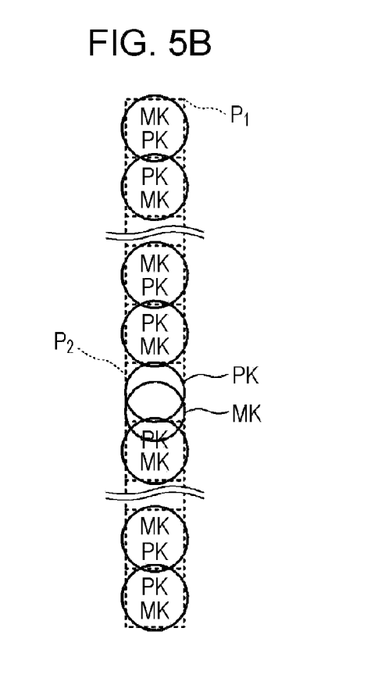
Figure 5C:
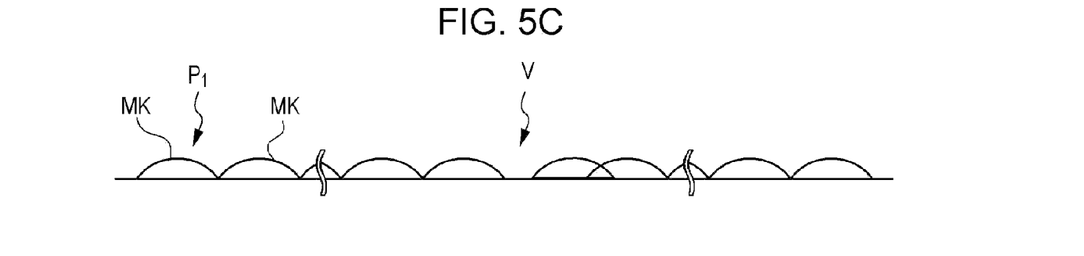

Moreover, in the case where two kinds of black ink droplets can be ejected from a printing head, the two kinds of black ink droplets are ejected through two corresponding different nozzles. Therefore, assuming that two kinds of black ink droplets are ejected with respect to the same pixel through two corresponding different nozzles, even though one of the two nozzles is a nozzle through which a black ink droplet is ejected onto a position misaligned from a default position because of certain manufacturing errors and the like, the other one of the two nozzles is highly likely to be a nozzle through which another black ink droplet is ejected onto a position different from the misaligned position. For example, in the case where a specific nozzle of nozzles through each of which an MK ink droplet is ejected is a nozzle through which a black ink droplet is ejected onto a position misaligned from a default position, when performing printing using only the MK ink is performed with a resolution resulting from recording the MK ink droplets at intervals of a distance the same as a pith of the nozzles, as shown in FIGS. 5A and 5C, a black line extending in the sub-scanning direction is formed by the ejected MK ink droplets. However, an ink droplet, which is ejected through a nozzle through which black ink droplets are likely to be recorded on a position misaligned from a default position, is sometimes recorded on the position misaligned from the default position, and thus, for example, if a nozzle Nme shown in FIG. 3A is the nozzle through which black ink droplets are likely to be recorded on a position misaligned from a default position, as a result, as shown in FIG. 5A, a space V occurs between the black ink droplets. In addition, FIGS. 5A and 5C are schematic diagrams illustrating conditions of recorded ink droplets just like those in FIGS. 3B and 3C, respectively.

Figure 5D:
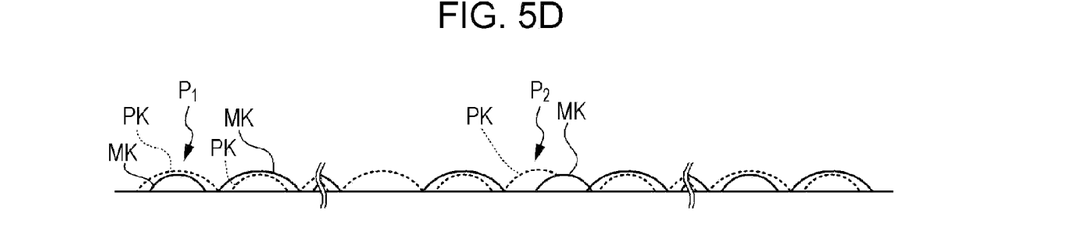

Meanwhile, in the above-described configuration according to this embodiment, in which two kinds of black ink droplets are ejected, even though, with respect to a certain pixel, a position onto which an MK ink droplet is ejected is misaligned from a default position, with respect to the certain pixel, a PK ink droplet is also recoded, and thus, it is possible to suppress occurrences of the space V shown in FIGS. 5A and 5C. For example, FIGS. 5B and 5C are schematic diagrams illustrating conditions similar to those of FIGS. 3B and 3C, respectively, in which black lines are formed by recording two kinds of black inks. As shown in FIGS. 5B and 5D, even though a firstly printed MK ink droplet is recorded on a position misaligned from a default position corresponding to a pixel $P_2$, a secondly printed PK ink droplet is highly unlikely to be recorded on the position misaligned from the default position corresponding to the pixel $P_2$. Furthermore, with respect to the pixel $P_2$, since the PK ink droplet is recorded subsequent to recording of the MK ink droplet, the PK ink droplet is likely to be widely spread on the MK ink droplet in a wet condition, so that it is possible to suppress occurrences of the space V with respect to the pixel $P_2$. Therefore, even though the first recording of black ink droplets results in a condition in which black lines, each being to be viewed as a continuous line, are viewed as discontinuous lines, the second recording of black line droplets enables suppression of occurrences of such a condition, and leads to an improvement in which the discontinuous lines are more likely to be viewed as continuous lines.

Further, any black line, which is printed without using CMY inks, is not viewed under a condition in which the black line includes any of chromatic colors. Further, in computer aided designs (CADs), a color of any black line is required to be an achromatic black color, and therefore, if this embodiment is applied to a case where any drawing having been developed by using the CAD is printed, it is possible to print the drawing, which has been developed by using the CAD, under a condition where any black line of the drawing is not printed in chromatic color. In addition, since, with respect to data created by using the CAD, line segments are specified by line segment commands (a line command and the like), line segment commands for drawing black lines each having a width of less than or equal to two dots are extracted, and regarding lines specified by the extracted by the line segment commands, processing may be configured such that printing is performed so as to overlap two kinds of black colors. Moreover, in the CAD, in the case where black lines each having a width size of less than or equal to two dots are entirely used for particular applications, such as an application in which such a black line is used as a dimension line indicating a dimension, the black lines used for particular applications are extracted, and regarding the extracted black lines, processing may be configured such that printing is performed so as to overlap two kinds of black inks.

(2) Other Embodiments

The above-described embodiment is just one of examples in which the invention is embodied, and other various embodiments can be employed within a scope where printing of black lines can be performed so as to overlap two kinds of black inks. For example, a computer is provided with a printing controller, and the computer and a printer may constitute a printing apparatus according to an embodiment of the invention.

Further, in the above-described embodiment, when performing printing of black lines, MK and PK grayscale values are made "255", respectively, to use both the MK and PK colors with respect to all pixels constituting the black lines, but, on the condition that it is possible to suppress occurrences of a phenomenon in which black lines to be viewed as continuous lines are viewed as discontinuous lines, a usage amount of one or both of the MK and PK inks may be suppressed. That is, a usage amount of one or both of the MK and PK inks may be adjusted so as be decreased within a range not exceeding an upper limit of a recordable amount of inks per a unit of area.

In addition, comparing a usage amount of glossy paper and a usage amount of matte paper in printing of drawings, the matte paper is more likely to be used for printing of drawings, and further, since the MK ink, which is a black ink for printing using the matte paper, makes the black color thereof be very deep black and makes an amount of running of an ink be less on the matte paper, as compared with a case in which the glossy paper is used, a configuration, in which a usage amount of the MK ink is set to an upper limit of a recordable amount of an ink per a unit of area, and a usage amount of the PK ink is set to an amount less than the upper limit of an amount of an ink per a unit of area, may be employed.

Further, usage amounts of the respective two kinds of black inks can be determined by employing any of various methods. For example, with respect to prescribed kinds of printing media among selectable printing media associated with the printing apparatus 10, respective usage amounts of the MK and PK inks, which are suitable for each of the prescribed kinds of printing media, are determined as default usage amounts thereof in advance. Further, in the case where, through the user I/F unit 45 of the printing apparatus 10, a user selects a printing medium from among the prescribed kinds of printing media, processing is performed such that usage amounts of the MK and PK inks are made default usage amounts for the selected printing medium.

Figure 4C:
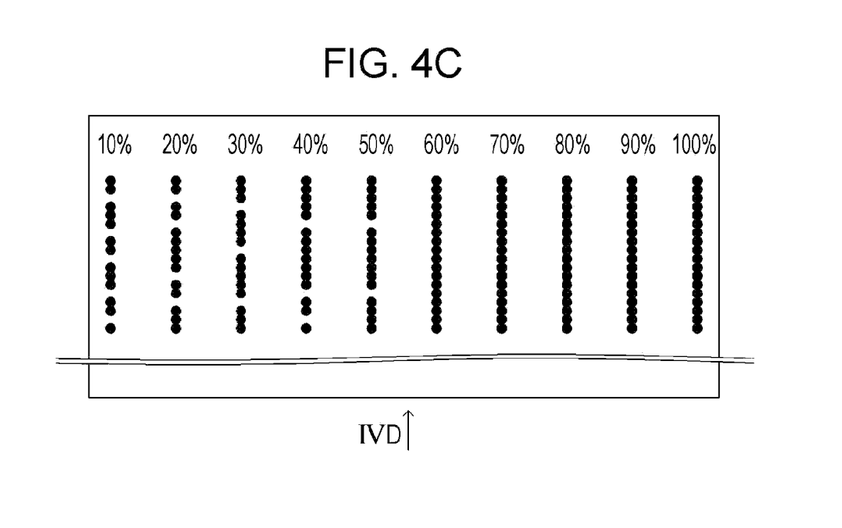
FIG. 4C is a diagram illustrating an example of a printed test pattern, according to embodiments of the invention.
Figure 4D:
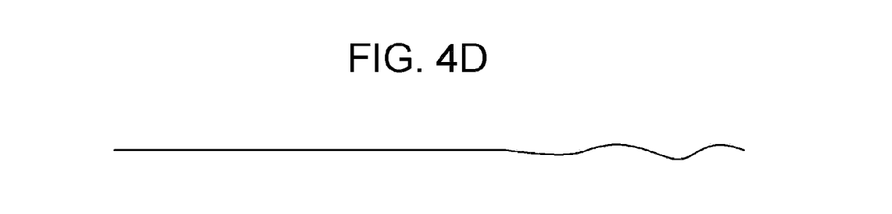
FIG. 4D is a diagram illustrating a flexure of a printing medium, according to embodiments of the invention.

Meanwhile, in the case where a printing medium other than the prescribed kinds of printing media (for example, any printing medium prepared by a user), is used, it is difficult to determine usage amounts of the respective MK and PK inks suitable for the printing medium in advance. Therefore, a configuration, in which the user can determine usage amounts of the respective MK and PK inks by performing printing of a test pattern, is adopted. FIG. 4C is a diagram illustrating an example of a test pattern, and this example shows a test pattern obtained by performing printing of a black line repeatedly under a condition where a usage amount of the MK ink is made a default amount (i.e., an upper limit of a recordable amount of an ink per a unit of area), and an usage amount of the PK ink is caused to vary at intervals of 10 percent of the upper limit of a recordable amount of an ink per a unit of area within a range from 10 to 100 percent of the upper limit of a recordable amount of an ink per a unit of area. Each of values, shown in FIG. 4C, within a range from 10 to 100 percent indicates a ratio (in percentage) of a usage amount of the PK ink included in a printed black line, which is shown below the value, relative to the upper limit of a recordable amount of an ink per a unit of area. Further, FIG. 4D is a diagram viewing a printing medium shown in FIG. 4C from a direction of an arrow IVD shown in FIG. 4D.

On the basis of a result of the test pattern and a condition of the printing medium viewed from the direction of the arrow IVD, a user determines his or her desired usage amount of the PK ink, taking into account running and discontinuity of the ink, bending of the printing medium, and the like. For example, FIG. 4C schematically shows a condition in which the black line to be viewed as a continuous line is viewed as a discontinuous line within a range where a usage amount of the PK ink is 10 to 50 percent of an upper limit amount of a recordable usage amount of an ink per a unit of area. Further, FIG. 4D schematically shows a condition in which the recording medium bends within a range where a usage amount of the PK ink is more than or equal to 70 percent of the upper limit of a recordable amount of an ink per a unit of area. Therefore, in the case where the test pattern shown in FIGS. 4C and 4D has been printed, a condition, in which a ratio of a usage amount of the PK ink relative to the upper limit of a recordable amount of an ink per a unit of area is 60 percent is suitable as a usage amount of the PK ink.

After having completed printing of the test pattern, the printing apparatus 10 outputs a UI, on which a user inputs a usage amount of the PK ink, at the user I/F unit 45. Further, after the user has specified a usage amount of the PK ink by using the UI, in the case where printing is performed on a printing medium other than the prescribed kinds of printing media, the printing apparatus 10 performs printing of black lines under a condition where a usage amount of the MK ink is made equal to the upper limit of a recordable amount of an ink per a unit of area, and a usage amount of the PK is made equal to the usage amount of the PK having been specified by the user. This configuration enables suppression of occurrences of a phenomenon in which black lines to be viewed as continuous lines are viewed as discontinuous lines, occurrences of running of each of the black inks, occurrences of bending of the printing medium and the like, along with suppression of a usage amount of the PK.

What is claimed is:

1. A printing apparatus which performs printing using a cyan ink, a magenta ink, a yellow ink, and two kinds of black inks, the printing apparatus comprising:
   an image data acquisition section configured to acquire image data representing an image targeted for printing;
   a black line specification section configured to specify a black line included in the image on the basis of the image data;
   a printing control section configured to perform control so as to, along with performing printing of the black line by using the two kinds of black inks, perform printing with respect to pixels forming at least one portion of the black line so as to overlap the two kinds of black inks, and perform printing of a portion other than the black line by using at least one of the cyan ink, the magenta ink, the yellow ink, and the two kinds of black inks;
   wherein the two kinds of black inks are a first black ink and a second black ink whose concentration is lower than that of the first black ink, and
   the printing control section is configured to, in the case where a printing medium selected from among prescribed kinds of printing media is used, the prescribed kinds of printing media having been determined in advance, perform printing of the black line under a condition where usage amounts of the first black ink and the second black ink are set to default amounts, respectively, and in the case where a printing medium other than the prescribed kinds of printing media is used, perform printing of the black line under a condition where a usage amount of the first black ink is set to a default amount, and a usage amount of the second black ink is set to an amount selected from amounts included within a prescribed variable range.

2. The printing apparatus according to claim 1, wherein, when performing printing of the black line, the printing control section performs setting of a usage amount of the first black ink so as to cause a usage amount of the first black ink to be equal to an upper limit of a recordable amount of the first black ink per a unit of area of a printing medium.

3. The printing apparatus according to claim 1, wherein the black line is a line having a width whose size is smaller than or equal to a size of two dots.

4. The printing apparatus according to claim 1, wherein the black line is a line having a width whose size is equal to a size of one dot.

5. The printing apparatus according to claim 1, wherein the black line specification section is configured to, in the case where a drawing is a target for printing, specify a black line included in the image, and the printing control section is configured to, in the case where the drawing targeted for printing includes the black line, perform printing of the black line by using the two kinds of black inks.

6. The printing apparatus according to claim 1, further comprising a control unit that executes the image data acquiring, the black line specifying, and the control performing.

7. The printing apparatus according to claim 1, wherein:
   the specifying comprises determining whether or not the image data includes at least one black line.

8. The printing apparatus according to claim 1, wherein:
   the specifying comprises determining whether or not the image data is for a drawing,
   if the image data is determined to not be for a drawing, determining that the image data does not include a black line, and
   if the image data is determined to net-be a drawing, determining whether or not the drawing includes a black line.

9. A printing method for performing printing using a cyan ink, a magenta ink, a yellow ink, and two kinds of black inks, the printing method comprising:
   acquiring image data representing an image targeted for printing;
   specifying a black line included in the image on the basis of the image data;
   performing control so as to, along with performing printing of the black line by using the two kinds of black inks, perform printing with respect to pixels forming at least one portion of the black line so as to overlap the two kinds of black inks, and perform printing of a portion other than the black line by using at least one of the cyan ink, the magenta ink, the yellow ink, and the two kinds of black inks;
   wherein the two kinds of black inks are a first black ink and a second black ink whose concentration is lower than that of the first black ink; and
   wherein performing the control includes, in the case where a printing medium selected from among prescribed kinds of printing media is used, the prescribed kinds of printing media having been determined in advance, performing printing of the black line under a condition where usage amounts of the first black ink and the second black ink are set to default amounts, respectively, and in the case where a printing medium other than the prescribed kinds of printing media is used, performing printing of the black line under a condition where a usage amount of the first black ink is set to a default amount, and a usage amount of the second black ink is set to an amount selected from amounts included within a prescribed variable range.

10. A printing apparatus which performs printing using a cyan ink, a magenta ink, a yellow ink, and two kinds of black inks, the printing apparatus comprising:
    an image data acquisition section configured to acquire image data representing an image targeted for printing;

a black line specification section configured to specify a black line included in the image on the basis of the image data;

a printing control section configured to perform control so as to, along with performing printing of the black line by using the two kinds of black inks, perform printing with respect to pixels forming at least one portion of the black line so as to overlap the two kinds of black inks, and perform printing of a portion other than the black line by using at least one of the cyan ink, the magenta ink, the yellow ink, and the two kinds of black inks;

wherein the printing control section is configured to, in the case where a printing medium is a first kind of multiple kinds of prescribed printing media, the prescribed kinds of printing media having been determined in advance, perform printing using the first black ink but not the second black ink, and the printing control section is configured to, in the case where the printing medium is a second kind of the multiple kinds of prescribed printing media, perform printing using the first black ink and the second black ink.

* * * * *